United States Patent Office 3,658,833
Patented Apr. 25, 1972

3,658,833
BENZOFURANS
Guglielmo Kabas, Binningen, Basel-Land, and Hans Schlapfer, Basel, Switzerland, assignors to Ciba-Geigy AG, Basel, Switzerland
No Drawing. Filed June 15, 1970, Ser. No. 46,450
Claims priority, application Switzerland, June 27, 1969, 9,862/69
Int. Cl. C07d 99/04; C09k 1/02
U.S. Cl. 260—308 B     5 Claims

ABSTRACT OF THE DISCLOSURE

1 - (benzofur - 2 - yl) - 4 - (4',5' - disubstituted-v-triazole-2'-yl)-phenylenes are prepared by diazotising p-(benzofur-2-yl)-anilines and (a) coupling the obtained diazonium compound with a ketone, reacting the obtained hydroxylamine to an oximehydrazone, closing the v-triazole ring by oxidising and reducing the obtained v-triazole-1-oxide or (b) coupling with an aniline or naphthylamine and heating the obtained azo compound in the presence of an oxidising agent. The new benzofurans are useful as brighteners or organic high-molecular materials.

DESCRIPTION OF INVENTION

The present invention relates to new benzofuran compounds, to their use for the optical brightening of organic materials, and compositions thereof.

It has been found that compounds of the following Formula I are able to optically brighten organic materials.

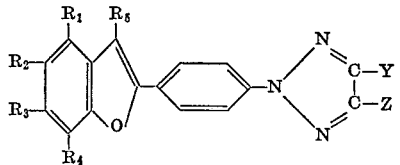

(I)

In the above formula, $R_1$ represents hydrogen, a lower alkyl group, or together with $R_2$ it represents an annularly-linked benzene radical, $R_2$ represents hydrogen, a lower alkyl group or alkoxy group, halogen, a carboxy, a carbalkoxy, an aminocarbonyl, a mono- or dialkylaminocarbonyl, a sulphonic acid, an alkyloxysulphonyl, an aminosulphonyl or a mono- or dialkylaminosulphonyl group, or together with $R_1$ it represents an annularly-linked benzene radical, $R_3$ represents hydrogen or a lower alkyl group or alkoxy group, or together with $R_4$ it represents an annularly-linked benzene radical, $R_4$ represents hydrogen, a lower alkyl group or halogen, or together with $R_3$ it represents an annularly-linked benzene radical, $R_5$ represents hydrogen, a lower alkyl group or an optionally substituted phenyl group.

Y represents the phenyl group,

Z represents the methyl group, or

Y and Z together with the carbon atoms of the triazole ring represent a phenylene group which can be substituted in the 4- and/or 5-position by a lower alkyl group or alkoxy group, or they represent a naphthylene-(1,2)-group which can be substituted by a sulphonic acid group or dialkylaminosulphonyl group.

Benzofurans of Formula I are preferred, wherein $R_1$ represents hydrogen, or alkyl having 1–4 carbon atoms, $R_2$ represents hydrogen, an alkyl group having 1–6 carbon atoms, an alkoxy group having 1–4 carbon atoms, chlorine, the carboxy group, a carbalkoxy group having 2–5 carbon atoms, a dialkylaminosulphonyl group having 1–4 carbon atoms in each alkyl group, or phenyl, $R_3$ represents hydrogen, an alkyl group having 1–4 carbon atoms, or an alkoxy group having 1–4 carbon atoms, $R_4$ represents hydrogen or chlorine, $R_5$ represents hydrogen, an alkyl group having 1–4 carbon atoms, or the phenyl group, Y represents the phenyl group, Z represents the methyl group, or Y and Z together with the carbon atoms of the triazole ring represent a phenylene group which can be substituted in the 4- and/or 5-position by an alkyl group having 1–4 carbon atoms, or by an alkoxy group having 1–4 carbon atoms; or a naphthylene-(1,2)-group which can be substituted by the sodium salt of the sulphonic acid group or dialkylaminosulphonyl group having 1–4 carbon atoms in each alkyl group.

Compounds are most preferred in which $R_1$ is hydrogen or methyl, $R_2$ is hydrogen, chlorine, alkyl having 1 to 4 carbon atoms, methoxy, carbomethoxy, diethylaminosulphonyl or phenyl, $R_3$ is hydrogen, methyl, chlorine or methoxy, $R_4$ is hydrogen or methyl, $R_5$ is hydrogen, methyl or phenyl, Y is phenyl, Z is methyl, and Y and Z together with the carbon atoms of the triazole ring represent a phenylene group which can be substituted in the 4- and/or 5-position by methyl or methoxy; or a naphthylene-(1,2)-group which can be substituted by a sodium salt of sulphonic acid group or by diethylaminosulphonyl.

The alkyl groups $R_1$, $R_2$, $R_3$ and $R_5$ and the alkyl substituents of the phenylene group which is formed from Y and Z together with the carbon atoms of the triazole ring, are for example methyl, ethyl, propyl, n-butyl, isobutyl, pentyl or hexyl.

The alkoxy groups $R_2$, $R_3$ and the alkoxy substituents of the phenylene group, which is formed from Y and Z together with the carbon atoms of the triazole ring, are for example, methoxy, ethoxy, propoxy and butoxy. The carbalkoxy groups $R_2$ can be for example carbomethoxy, carboethoxy, carbopropoxy and carbobutoxy.

The dialkylaminosulphonyl groups $R_2$ and the dialkylaminosulphonyl substituents of the naphthylene-(1,2)-group, which is formed from Y and Z together with the carbon atoms of the triazole ring, are for example, dimethylaminosulphonyl, diethylaminosulphonyl, dipropylaminosulphonyl, dibutylaminosulphonyl, methylethylaminosulphonyl, methylbutylaminosulphonyl, ethylbutylaminosulphonyl or propylbutylaminosulphonyl.

In some cases the new compounds have an optical brightening action many times greater than that of already known benzofuran compounds. They have, moreover, a wide field of application. In particular, they are used for the brightening of organic high-molecular materials such as textile materials, preferably synthetic textile materials, of various kinds, such as wool, cotton and synthetic or semi-synthetic fibres, e.g. particularly those made from polyesters such as polyterephthalic acid glycol esters, also those made from polyolefins such as polypropylene and polyethylene, polyamides such as nylon 6 and nylon 66, polyacrylonitrile, polyvinyl chloride and cellulose esters such as cellulose-2½-acetate and cellulose triacetate. The organic material can be brightened, for example, by incorporating into it small amounts of optical brighteners according to the invention, preferably 0.001 to 1% relative to the material to be brightened, optionally together with other substances such as softeners, stabilisers or pigments. The brighteners may be worked into the synthetic materials, e.g. dissolved in softeners such as dioctylphthalate, or together with stabilisers such as dibutyl tin dilaurate or sodium pentaoctyltripolyphosphate, or together with pigments such as, e.g. titanium dioxide. Depending on the nature of the material to be brightened, the brightener can also be dissolved in the monomers before polymerisation, in the polymer mass, or together with the polymers in a solvent. The thus pre-treated material is afterwards brought into the desired ultimate form by methods known per se, such as calendering, pressing, extrusion, coating, moulding and, in particular, by spinning and stretching. It is also possible to work the brighteners into finishings, e.g. into finishings for textile fibres such as polyvinyl alcohol, or into resins or resin pre-condensates such as, e.g. methylol compounds of ethylene urea, which are used for the treatment of textiles.

Preferably, however, colourless, high-molecular, organic material is brightened in the form of fibres. For the brightening of these fibre materials, an aqueous dispersion of the benzotriazoles of Formula I according to the invention is advantageously used. The brightener dispersion preferably has in this case a content of 0.005–0.5% of benzotriazole according to the invention, relative to the fibre material. In addition, the dispersion can contain auxiliaries such as dispersing agents, e.g. condensation products of fatty alcohols or alkylphenols containing 10 to 18 carbon atoms, with 15 to 25 moles of ethylene oxide, or condensation products of alkylmono- or polyamines containing 16 to 18 carbon atoms, with at least 10 moles of ethylene oxide, organic acids such as formic, oxalic or acetic acid, detergents, swelling agents such as di- or trichlorobenzenes, wetting agents such as sulphosuccinic acid alkyl esters, bleaching agents such as sodium chlorite, peroxides or hydrosulphites, as well as, optionally, brightening agents of other classes such as, e.g. derivatives of stilbene having affinity to cellulose.

The brightening of the fibre material with the aqueous brightener dispersion is performed either in the exhaust process, at temperatures of preferably 30 to 150° C., or in the padding process. In the latter case, the material is impregnated, e.g. with a 0.2–0.5% brightener dispersion, and then finished, e.g. by a dry or moist heat treatment, e.g. by steaming at 2 atm., or, after the drying treatment, by a short dry heating to 180–220° C., whereby, optionally, the fabric is simultaneously thermofixed. The fibre material treated in this manner is finally rinsed and dried.

Colourless, high-molecular, organic material optically brightened according to the invention, particularly the natural or synthetic fibre material brightened in the exhaust process, has a pleasing, pure white, blue-violet to bluish fluorescent appearance. Such material dyed in light shades and brightened according to the invention is distinguished by a pure shade.

Also detergents can contain such benzofurans of Formula I and be used for the brightening of textiles.

Such detergents may contain the usual fillers and auxiliaries, e.g. alkali-poly- and -polymetaphosphates, alkali silicates, alkali borates, alkali salts of carboxymethyl celluloses, foam stabilisers such as alkanolamides, higher fatty acids, or complexones such as soluble salts of ethylenediaminetetraacetic acid, as well as chemical bleaching agents such as perborates or percarbonates.

The new benzofurans are worked into the detergents or into washing liquors advantageously in the form of their solutions in neutral, water-miscible and/or readily volatile, organic solvents such as lower alkanols, lower alkoxyalkanols or lower aliphatic ketones. They can, however, also be used in a finely dispersed solid form, on their own or in admixture with dispersing agents. For example, they can be mixed, kneaded or milled with the washing-active substances, and then the usual auxiliaries and fillers added. The brightening agents are, for example, stirred together with the washing-active substances, usual auxiliaries and fillers, and water to form a slurry, and this is then sprayed in a spray dryer. The new benzofuran derivatives may also be added to the finished detergents; e.g. by spraying of a solution in a readily volatile and/or water-soluble organic solvent on to the dry detergents as these are kept in motion.

The content in the detergents of optical brightener of Formula I is advantageously 0.001–0.5% relative to the solid content in the detergent. Detergents containing such optical brighteners of Formula I frequently have, compared with detergents containing no brightener, a greatly improved white appearance in daylight.

Washing liquors containing the benzofurans of Formula I impart, during washing, to the textile fibres treated therewith, e.g. cotton or synthetic polyamide, polyester, polyolefin and cellulose ester fibers, a brilliant appearance in daylight.

The compounds of the Formula I can be produced as follows:

An optionally substituted 2-(4'-aminophenyl)-benzofuran is diazotised and the obtained diazonium salt coupled with a ketone of the formula

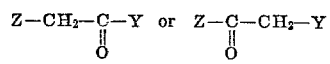

whereupon the azo compound is reacted in the usual manner with hydroxylamine to an oxime hydrazone, then ring closure brought about oxidatively, e.g. with copper sulphate, to give a v-triazole-1-oxide, and this finally reduced with nascent hydrogen, e.g. with zinc and glacial acetic acid, to the desired compound. The ring closure can also be made directly with acetic acid anhyldride.

If Y and Z in Formula I together with the carbon atoms of the triazole ring represent a condensed, optionally substituted phenylene or naphthylene-(1,2)-group, the above mentioned diazonium salt can be coupled in the o-position to the amino group of an optionally substituted aniline or naphthylamine, and the azo compound converted in the presence of an oxidising agent, e.g. copper sulphate, with heating, directly into the v-triazole compound.

The 2-(4'-aminophenyl)-benzofurans are produced in known manner, e.g. after the manner of the method given in U.S.S.R. Pat. 166,042.

In the following examples, the temperatures are given in degrees centigrade. Parts denote parts by weight.

Example 1

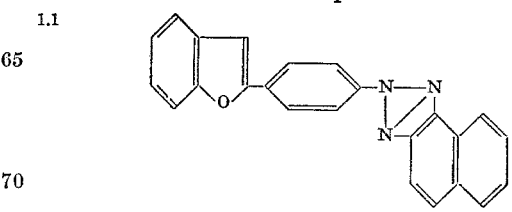

A suspension of 21.0 g. of 2-(4'-aminophenyl)-benzofuran in 50 ml. of water, 30 ml. of concentrated hydrochloric acid and 50 g. of coarse quartz sand is vigorously stirred for 16 hours at room temperature. The beige-coloured suspension of the formed aminohydrochloride is diluted with 30 ml. of conc. hydrochloric acid and 200 ml. of water, filtered off from the quartz sand and diazotised at 0–5° with 7.2 g. of sodium nitrite in 30 ml. of water. A yellowish suspension is formed, which is stirred for 2 hours at 0–5°. The excess nitrous acid is then decomposed with sulphamic acid and the obtained diazonium salt suspension added dropwise within one hour at 0° to a solution of 14.4 g. of 2-naphthylamine in 200 ml. of pyridine. The reaction mixture is stirred for a further 3 hours at 0–10°.

The obtained dark red azo compound is filtered off under suction, washed with water and dissolved in 300 ml. of pyridine at 90°. To the obtained solution are then added 65 g. of copper sulphate pentahydrate dissolved in 120 ml. of hot water. The reaction mixture is stirred up for 4 hours at 90–95°, whereby 1-(benzofur-2-yl)-4-(naphtho-1,2:4′, 5′-triazol-2′-yl)-phenylene precipitates as light yellow powder. This is filtered off under suction, washed with water and dilute ammonia, and dried. After recrystallisation four times from toluene, and with the aid of bleaching earth, 27.4 g. (corresponding to 76% of the theoretical value) of a pale yellow powder are obtained, M.P. 229–231° uncorr., absorption $\lambda_{max.}$ 364 nm.

When incorporated into plastics and synthetic fibres, such as polyvinyl chloride, as well as polyesters of terephthalic acid, this compound produces strong brightening effects.

Similar properties are possensed by the following compounds. They are obtained analogously to the above described procedure.

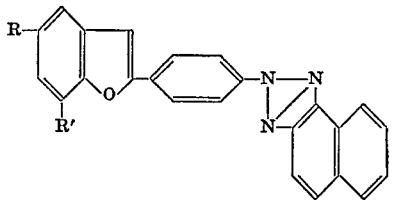

| R | R′ | Melting point uncorrected, degrees | Absorption $\lambda_{max.}$ nm. |
|---|---|---|---|
| 1.2 Cl | H | 252–254 | 365 |
| 1.3 Cl | Cl | 242–243 | 367 |
| 1.4 CH₃ | H | 218–219 | 367 |
| 1.5 tert.Butyl | H | 203–204 | 365 |
| 1.6 C₆H₅ | H | 254–257 | 365 |

The above used 2-(4′-aminophenyl)-benzofuran is obtained as follows:

A mixture of 183 g. of salicylaldehyde, 258 g. of p-nitrobenzyl chloride, 320 g. of anhydrous sodium carbonate, 5 g. of sodium iodide and 1500 ml. of methanol is refluxed for 5 hours. The reaction mixture is then cooled to 10°, filtered under suction, the filter residue washed with 400 ml. of cooled methanol and subsequently washed with water at 40–50° until a neutral reaction of the filtrate is obtained. After drying, 309.2 g., corresponding to 80% of the theoretical value, of 2-(4′-nitrobenzyloxy)-benzaldehyde, M.P. 115–116°, are obtained.

A mixture of 309.2 g. of 2-(4′-nitrobenzyloxy)-benzaldehyde and 195 g. of anhydrous potassium carbonate in 1500 ml. of methanol is refluxed at the boiling point for 5 hours. The yellow reaction mixture is then cooled to 10°, filtered under suction and the suction-filter residue washed with cooled methanol and afterwards with water at 40–50° until the reaction of the filtrate is neutral.

After drying 270 g. are obtained, corresponding to 98% of the theoretical value, of 2-(4′-nitrophenyl)-benzofuran, M.P. 178–180°.

The amino compound is produced by treating 300 g. of iron chips in 300 ml. of water with 60 ml. of acetic acid at 90° for 30 minutes. 800 ml. of cyclohexanone are afterwards added, the mixture is heated to 95–100° and, within 1 hour, 239.22 g. of 2-(4′-nitrophenyl)-benzofuran are introduced in small portions. The reaction mixture is refluxed for 4 hours, made alkaline with 60 g. of sodium carbonate and filtered off hot. The filtrate is distilled with steam and the residue dried. The thus obtained 2-(4′-aminophenyl)-benzofuran weighs 203 g., corresponding to 97.2% of the theoretical value, and melts at 145–147° uncorr. The benzofurans given in the following table can be produced in a similar manner.

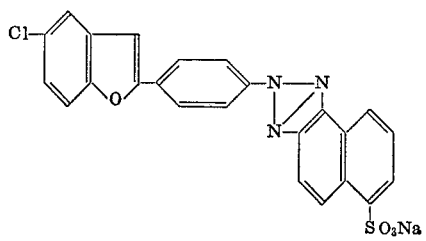

| R | R′ | Melting Point uncorrected, degrees |
|---|---|---|
| Cl | H | 174–176 |
| Cl | Cl | 171–172 |
| CH₃ | H | 160–162 |
| tert.Butyl | H | 128–131 |
| C₆H₅ | H | 154–156 |

Example 2

2.1

![structure]

A suspension of 24.3 g. of 2-(4′-aminophenyl)-5-chlorobenzofuran in 50 ml. of water, 30 ml. of conc. hydrochloric acid and 50 g. of coarse quartz sand is vigorously stirred for 16 hours at room temperature. The beige-coloured suspension of the formed aminohydrochloride is diluted with 30 ml. of concentrated hydrochloric acid and 200 ml. of water, filtered off from the quartz sand and diazotised at 0–5° with 7.2 g. of sodium nitrite in 30 ml. of water. A yellowish suspension is obtained which is diazotised out within 2 hours at 0–5°. The excess nitrous acid is decomposed with sulphamic acid and the obtained diazonium salt suspension is subsequently added dropwise to a suspension of 22.3 g. of 2-aminonaphthalene-5-sulphonic acid in 400 ml. of water, within 1 hour at 10–15°. By the addition of sodium acetate, the pH-value is maintained at 3–3.5. The reaction mixture is stirred for a further 3 hours at 10–15°, the obtained azo compound filtered off with suction, washed with water and dissolved in 600 ml. of pyridine, 250 ml. of water and 50 ml. of a 30% sodium hydroxide solution at 85–90°. To this solution are added 25 ml. of a 1 mol. copper sulphate solution and an air stream is fed into the reaction mixture. After ca. 6 hours reaction time, the azo dyestuff has disappeared and oxidation is complete. 50 ml. of a 15.6% sodium sulphide solution are then added, the suspension is filtered hot and the filtrate distilled with steam. The crude 1-(5-chlorobenzofur-2-yl)-4-(naphtho - 1,2:4′,5′-triazol-2′-yl)-phenylene-6′-sulphonic acid sodium precipitates as light yellow powder. This is filtered under suction and after recrystallisation from a mixture of water/pyridine, and with the aid of active charcoal, 40 g. of pale yellow powder (corresponding to 86% of the theoretical value), absorption $\lambda_{max.}$ 363 nm., are obtained.

The thus obtained compound is an excellent agent for the brightening of polyamide fibres, and also cotton fabrics.

The compounds listed in the following table can be produced in an analogous manner to that described in the above example. They possess similar properties to those of the above stated product.

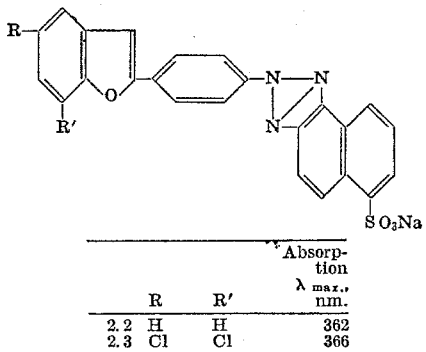

| R | R' | Absorption λ max., nm. |
|---|---|---|
| 2.2 | H | H | 362 |
| 2.3 | Cl | Cl | 366 |

Example 3

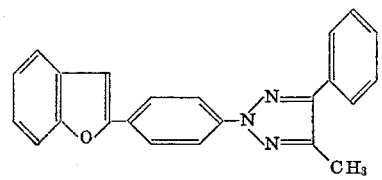

A suspension of 21.0 g. of 2-(4'-aminophenyl)-benzofuran in 50 ml. of water, 30 ml. of concentrated hydrochloric acid and 50 g. of coarse quartz sand is vigorously stirred for 16 hours at room temperature. The beige-coloured suspension of the formed aminehydrochloride is diluted with 30 ml. of concentrated hydrochloric acid and 200 ml. of water, filtered off from the quartz sand and diazotised at 0–5° with 7.2 g. of sodium nitrite in 30 ml. of water. A yellowish suspension is obtained, which is stirred for 2 hours at 0–5°. The excess nitrous acid is afterwards decomposed with sulphamic acid, and the obtained diazonium salt suspension added dropwise at 0° within 1 hour to a solution of 14.8 g. of benzylmethyl ketone in 200 ml. of pyridine. The reaction mixture is stirred for a further 20 hours at room temperature. The obtained azo compound is filtered off under suction, washed with water and suspended in 600 ml. of boiling ethanol. To the boiling suspension are added 7.7 g. of hydroxylamine hydrochloride dissolved in 10 ml. of water, and 7.4 g. of sodium acetate trihydrate dissolved in 10 ml. of water. The reaction mixture is then refluxed at the boiling temperature for a further 6 hours, filtered off and washed with water. After drying is completed, 33.2 g. (corresponding to 90% of the theoretical value) of oxime hydrazone, M.P. 257–260°, are obtained. The product can be recrystallised for methylcellosolve, and it afterwards melts at 257–258°.

37 g. of the thus produced oxime hydrazone are dissolved in 400 ml. of pyridine at 90–100°. To the obtained solution is then added dropwise a solution of 75 g. of copper sulphate pentahydrate dissolved in 60 ml. of water, and the whole further stirred for 4 hours. The reaction mixture is afterwards diluted with 400 ml. of water, cooled; and the formed 4-phenyl-5-methyl-2-(2'-phenyl-benzofuryl-4')-v-triazole-1-oxide (35 g., corresponding to 95.5% of the theoretical value), M.P. 189–190°, filtered off under suction. After a single recrystallisation from chlorobenzene, the melting point is 192–194°. 10 g. of 1-(benzofur-2-yl)-4-(4'-methyl-5'-phenyl - v - triazol-2'-yl-1'-oxide)-phenylene are refluxed with 2.7 g. of zinc dust and 4 ml. of glacial acetic acid in 100 ml. of chlorobenzene for 8 hours. The reaction mixture is then filtered hot and distilled with steam. The 1-(benzofur-2-yl)-4-(4'-methyl-5'-phenyl-v-triazol-2'-yl)-phenylene remaining behind is recrystallised twice from ligroin, and melts at 177–179° (uncorrected), absorption λmax. 340 nm.

This compound is suitable for the brightening of the most diverse synthetic substances and synthetic fibres, especially polyesters of terephthalic acid. The compounds given below can be produced analogously to the above example and using the same procedure. They possess similar properties to those of the above stated product.

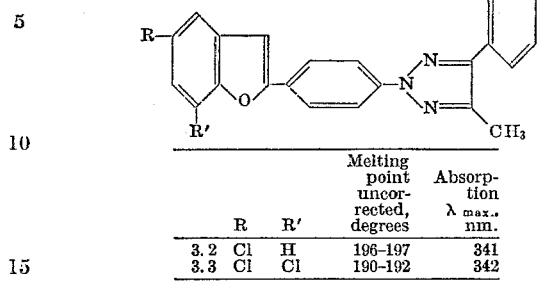

| | R | R' | Melting point uncorrected, degrees | Absorption λ max., nm. |
|---|---|---|---|---|
| 3.2 | Cl | H | 196–197 | 341 |
| 3.3 | Cl | Cl | 190–192 | 342 |

Example 4

4.1
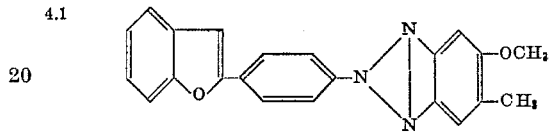

A suspension of 12.2 g. of 2-(4'-aminophenyl)-5-chlorobenzofuran in 50 ml. of water, 25 ml. of conc. hydrochloric acid and 40 g. of coarse quartz sand is vigorously stirred for 16 hours at room temperature. The biege-coloured suspension of the formed amine-hydrochloride is diluted with 15 ml. of concentrated hydrochloric acid and 200 ml. of water, filtered off from the quartz sand and then diazotised at 0–5° with 3.6 g. of sodium nitrite in 20 ml. of water. A yellowish suspension is obtained, which is stirred for a further 2 hours at 0–5°. The excess nitrous acid is afterwards decomposed with sulphamic acid, and the obtained diazonium salt suspension added dropwise at 0° to a solution of 6.8 g. of 2-methoxy-4-aminotoluene in 150 ml. of pyridine within one hour. The reaction mixture is stirred for a further 3 hours at 0–10°. The obtained azo compound (M.P. 230–1° after recrystallisation from chlorobenzene) is filtered off under suction, washed with water and then dissolved in 200 ml. of pyridine at 90°. To the obtained solution are now added 33 g. of copper sulphate pentahydrate dissolved in 60 ml. of hot water. The reaction mixture is stirred for 6 hours at 90–95°, whereby 1-(benzofur-2-yl)-4-(5'-methyl-6'-methoxybenzotriazol-2'-yl)-phenylene precipitates as light-yellow powder. This is filtered off under suction, washed with water and dilute ammonia, and then dried. After recrystallisation three times from chlorobenzene are obtained, with the aid of bleaching earth, 14.6 g. of the compound, corresponding to 75% of the theoretical value, as yellow powder having a melting point of 285–7° (uncorrected), absorption λmax. 361 nm.

The thus obtained compound can be used for the brightening of synthetic fibres, specially those made from polyesters of terephthalic acid.

A similarly effective compound can be obtained according to the above example by using, instead of 2-methoxy-4-aminotoluene, a corresponding amount of 3,4-dimethoxyaniline, with otherwise the same procedure.

4.2
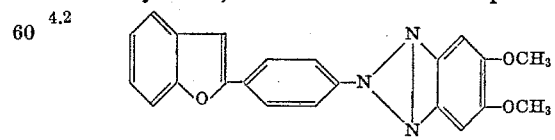

M.P.>300°; absorption λmax. 363 nm.

Example 5

5.1
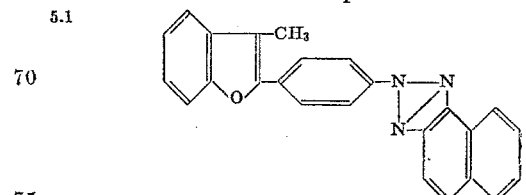

A suspension of 22.3 g. of 2-(4'-aminophenyl)-3-methylbenzofuran in 50 ml. of water, 30 ml. of conc. hydrochloric acid and 50 g. of coarse quartz sand is vigorously stirred for 16 hours at room temperature. The light grey suspension of the formed amine-hydrochloride is diluted with 30 ml. of concentrated hydrochloric acid and 200 ml. of water, filtered off from the quartz sand, and then diazotised at 0-5° with 7.2 g. of sodium nitrite in 30 ml. of water. A yellowish-orange suspension is obtained, which is diazotised within 2 hours at 0-5°. The excess nitrous acid is afterwards decomposed with sulphamic acid, and the obtained diazonium salt suspension added dropwise at 0° over one hour to a solution of 14.4 g. of 2-naphthylamine in 200 ml. of pyridine. The reaction mixture is stirred for a further 2 hours at 0-5° and then for 4 hours at room temperature. The obtained red azo compound is filtered off under suction, washed with water, and dissolved in 600 ml. of pyridine at 90°. To the dark red solution are added 65 g. of copper sulphate pentahydrate dissolved in 120 ml. of hot water. The reaction mixture is stirred for 4 hours at 90-95°, whereby 1-(3-methylbenzofur-2-yl) - 4-(naphtho - 1,2:4',5' - triazol-2'-yl)-phenylene precipitates as light-yellow powder. This is filtered, washed with water and then dried. After recrystallisation three times from chlorobenzene, and with the aid of bleaching earth, 28 g. (corresponding to 74.5% of the theoretical value) are obtained as pale yellow powder, M.P. 169-170° (uncorrected); absorption $\lambda_{max.}$ 364 nm.

The benzofurans listed in the following table and having similar properties are produced in a like manner to that described above by using correspondingly substituted benzofurans and optionally substituted 2-naphthylamines:

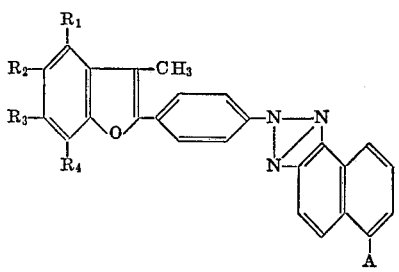

methanol for 8 hours at the boiling temperature, whereby 2-(4'-nitrophenyl) - 3 - methylbenzofuran precipitates as yellow powder. The mixture is then cooled to room temperature and the reaction product filtered off under suction; the filter residue is washed first with methanol and then with warm water, until the potassium carbonate has been removed; and subsequently dried. In this manner are obtained 202 g. (corresponding to 80% of the theoretical value) of 2-(4'-nitrophenyl)-3-methylbenzofuran in the form of a yellow powder, M.P. 133-5° (uncorrected). 300 g. of iron chips are treated in 300 ml. of water and 60 ml. of acetic acid, whilst stirring is maintained, for 30 minutes at 90°. 600 ml. of cyclohexanone are now added, and, as soon as the temperature has again risen to 90°, 253.3 g. of 2-(4'-nitrophenyl)-3-methylbenzofuran are introduced in small portions within one hour. The reaction mixture is subsequently maintained for 6 hours at 90-95°; 60 g. of sodium carbonate are then added, and the mixture subsequently filtered hot. The cyclohexanone is expelled with steam, and 215 g. (corresponding to 96% of the theoretical value) of 2-(4'-aminophenyl)-3-methylbenzofuran remain behind as yellow-brown powder, M.P. 47-50° (uncorrected). The amine can be recrystallised from a mixture of benzene and hexane, and it then has a melting point of 54-55° (uncorrected).

The 2-(4'-aminophenyl)-3-methylbenzofurans listed in the following table are produced in an analogous manner and have similar properties:

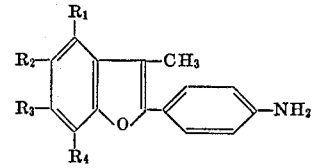

| $R_1$ | $R_2$ | $R_3$ | $R_4$ | Melting point uncorrected, degrees |
|---|---|---|---|---|
| H | CH$_3$ | H | H | 106-108 |
| H | Cl | H | H | 95-97 |
| H | Cl | H | Cl | 130-132 |
| H | H | CH$_3$O | H | 126-127 |
| H | CH$_3$ | H | Cl | 105-106 |
| CH$_3$ | Cl | CH$_3$ | H | 154-155 |

| | $R_1$ | $R_2$ | $R_3$ | $R_4$ | A | Melting point uncorrected, degrees | Absorption $\lambda_{max.}$, nm. |
|---|---|---|---|---|---|---|---|
| 5.2 | H | CH$_3$ | H | H | H | 170-171 | 370 |
| 5.3 | H | CH$_3$ | H | H | SO$_3$Na | | 368 |
| 5.4 | H | Cl | H | H | H | 224-225 | 364 |
| 5.5 | H | H | H | H | SO$_3$Na | | 364 |
| 5.6 | H | Cl | H | H | SO$_3$Na | | 366 |
| 5.7 | H | Cl | H | Cl | H | 257-259 | 363 |
| 5.8 | H | Cl | H | Cl | SO$_3$Na | | 363 |
| 5.9 | H | H | OCH$_3$ | H | H | 210-211 | 372 |
| 5.10 | H | CH$_3$ | H | Cl | H | 231-232 | 365 |
| 5.11 | H | CH$_3$ | H | Cl | SO$_3$Na | | 364 |
| 5.12 | H | CH$_3$ | H | Cl | SO$_2$N(C$_2$H$_5$)$_2$ | 213-214 | 364 |
| 5.13 | CH$_3$ | Cl | CH$_3$ | H | H | 214-216 | 362 |
| 5.14 | CH$_3$ | Cl | CH$_3$ | H | SO$_3$Na | | 361 |

The 2-(4'-aminophenyl)-3-methylbenzofuran used as starting material can be produced as follows: 136 g. of o-hydroxyacetophenone are heated in 750 ml. of methanol with 180 g. of p-nitrobenzyl chloride, 212 g. of sodium carbonate and 18 g. of sodium iodide over one hour, whilst stirring is maintained, to 60°; and the whole is then stirred for a further 6 hours at this temperature. The mixture is now cooled to room temperature, the precipitated residue filtered under suction, washed with methanol and afterwards with water, until the sodium carbonate has been removed, and then dried. In this manner are obtained 191.6 g. (corresponding to 71% of the theoretical value) of 2-(4'-nitrobenzyloxy)-acetophenone in the form of light-yellow powder, M.P. 102-104° (uncorrected).

271 g. of 2-(4'-nitrobenzyloxy)-acetophenone are refluxed with 166 g. of potassium carbonate in 800 ml. of Example 6

6.1

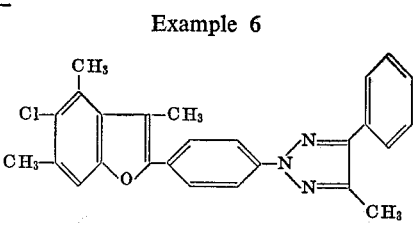

A suspension of the diazonium salt produced from 28.6 g. of 2-(4'-aminophenyl)-3,4,6-trimethyl-5-chlorobenzofuran, analogously to Example 3, is added dropwise at 0° within 1 hour to a solution of 14.8 g. of benzylmethyl ketone in 200 ml. of pyridine. The reaction mixture is stirred for 24 hours at room temperature. The obtained azo compound is filtered off, washed with water, and suspended in 600 ml. of boiling ethanol. To the boiling suspension are added 7.7 g. of hydroxylamine hydrochloride dissolved in 10 ml. of water, and 7.4 g. of sodium acetate trihydrate dissolved in 10 ml. of water. The reaction mixture is refluxed with stirring for a further 12 hours, filtered off under suction and washed with water. After drying, 16 g. (corresponding to 71.2% of the theoretical value) of oxime hydrazone, M.P. 237–240° (uncorrected) are obtained.

44.6 g. of the thus produced oxime hydrazone are dissolved in 400 ml. of pyridine at 90–95°. To the formed solution is then added dropwise a solution of 75 g. of copper sulphate pentahydrate in 60 ml. of water, and the whole is stirred for a further 4 hours. The reaction mixture is afterwards diluted with 400 ml. of water, cooled and the formed v-triazole-1-oxide filtered off with suction.

8.9 g. of v-triazole-1-oxide are refluxed in 200 ml. of chlorobenzene with 4 g. of zinc dust and 7 ml. of glacial acetic acid for 8 hours. The reaction mixture is then filtered hot and the chlorobenzene distilled off with steam. The crude 1-(3,4,6-trimethyl-5-chlorobenzofur-2-yl)-4-(4'-methyl-5'-phenyl-v-triazol-2'-yl)-phenylene which remains is thereupon recrystallised twice from ligroin with the aid of bleaching earth. It melts at 166–168° (uncorrected), absorption $\lambda_{max.}$ 337 nm.

In an analogous manner are produced the v-triazole benzofurans listed in the following table, which have similar properties:

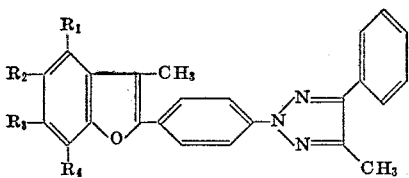

| | $R_1$ | $R_2$ | $R_3$ | $R_4$ | Melting point uncorrected, degrees | Absorption $\lambda_{max.,}$ nm. |
|---|---|---|---|---|---|---|
| 6.2 | H | Cl | H | H | 149–150 | 340 |
| 6.3 | H | H | CH₃O | H | 130–132 | 350 |
| 6.4 | H | Cl | H | Cl | 145–147 | 338 |
| 6.5 | H | H | H | H | 116–117 | 338 |
| 6.6 | H | CH₃ | H | H | 94–95 | 341 |

Example 7

7.1
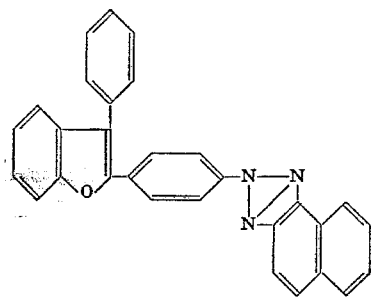

A suspension of 28.5 g. of 2-(4'-aminophenyl)-3-phenylbenzofuran in 50 ml. of water, 30 ml. of conc. hydrochloric acid and 50 g. of coarse quartz sand are vigorously stirred for 16 hours at room temperature. The beige-coloured suspension of the formed amine hydrochloride is diluted with 30 ml. of conc. hydrochloric acid and 200 ml. of water, filtered off from the quartz sand and diazotised at 0–5° with 7.2 g. of sodium nitrite dissolved in 30 ml. of water. A yellowish-red suspension is obtained which is stirred for a further 2 hours at 0–5°. The excess nitrous acid is then decomposed with sulphamic acid, and the obtained diazonium salt suspension added dropwise, at 0° within 1 hour, to a solution of 14.4 g. of 2-naphthylamine in 350 ml. of pyridine. The dark red reaction mixture is stirred for 18 hours at room temperature. The thus obtained azo compound is filtered off with suction, washed with hot water and then dissolved in 300 ml. of pyridine at 90°. To this solution are added 65 g. of copper sulphate pentahydrate dissolved in 100 ml. of hot water, and the reaction mixture is refluxed for 16 hours. The pyridine suspension is thereupon diluted with 500 ml. of water, and the precipitated 1-(3-phenylbenzofur-2-yl)-4-(naphtho-1.2:4',5'-triazol-2'-yl)-phenylene filtered off under suction, washed with water and diluted ammonia, and dried. After recrystallisation three times from ligroin with the aid of bleaching earth, 21 g. (corresponding to 48% of the theoretical value) are obtained as pale yellow powder, M.P. 166–168° (uncorrected), absorption $\lambda_{max.}$ 369 nm.

In an analogous manner are obtained the naphthotriazole-phenylbenzofurans given in the following table, which have similar properties:

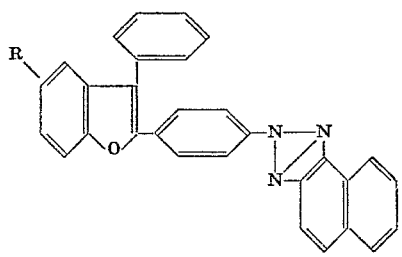

| R | Melting point uncorrected, degrees | Absorption $\lambda_{max.,}$ nm. |
|---|---|---|
| 7.2 Cl | 218–219 | 370 |
| 7.3 CH₃O | 195–196 | 376 |
| 7.4 COOCH₃ | 250–251 | 366 |
| 7.5 SO₂N(C₂H₅)₂ | 209–210 | 366 |

The 2-(4'-aminophenyl)-3-phenyl-benzofuran used as starting material can be produced as follows:

A mixture of 198 g. of 2-hydroxybenzophenone, 238 g. of p-nitrobenzyl bromide, 212 g. of anhydrous sodium carbonate and 1000 ml. of methanol is refluxed at boiling temperature for 12 hours. The reaction mixture is then cooled to 10°, filtered off under suction, the suction-filter residue washed with 400 ml. of cooled methanol and subsequently with hot water until a neutral reaction of the filtrate is shown. After drying, 320 g. (corresponding to 96% of the theoretical value) of 2-(4'-nitrobenzyloxy)-benzophenone, M.P. 104–105°, are obtained.

A mixture of 333 g. of 2-(4'-nitrobenzyloxy)-benzophenone and 166 g. of anhydrous potassium carbonate in 1100 ml. of methanol is refluxed for 6 hours. The yellow reaction product is thereupon cooled to 10°, filtered off under suction, and the suction-filter residue washed with cooled methanol and subsequently with warm water until a neutral reaction of the filtrate is shown. After drying, 244 g. (corresponding to 77.5% of the theoretical value) of 2-(4'-nitrophenyl)-3-phenylbenzofuran, M.P. 155–156°, are obtained.

The amino compound is produced by treating 300 g. of iron chips in 300 ml. of water with 60 ml. of acetic acid at 90° during 30 minutes. An addition is then made of 900 ml. of cyclohexanone, the mixture heated to 90–95°, and 315.3 g. of 2-(4'-nitrophenyl)-3-phenylbenzofuran are introduced in small portions within one hour. The reaction mixture is refluxed for 6 hours, rendered alkaline by the addition of 60 g. of sodium carbonate, and filtered hot. The cyclohexanone is then expelled with steam from the filtrate and the residue which remains is dried. By this means are obtained 275 g. of crude 2-(4'-aminophenyl)-3-phenylbenzofuran (corresponding to 96% of the theoretical value), which is isolated as hydrochloride, M.P. 230–232° (uncorrected), with decomposition.

The aminobenzofurans listed in the following table can be produced in a similar manner:

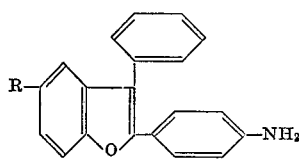

| R: | M.P. uncorr. |
|---|---|
| Cl | 163–164° |
| CH₃O | 132–133° |
| COOCH₃ | 209–210° |
| SO₂N(C₂H₅)₂ | 162–164° |

Example 8

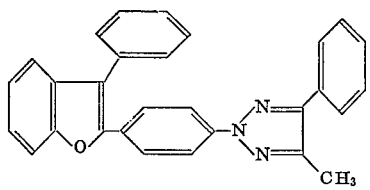

A suspension of diazonium salt produced from 28.5 g. of 2-(4'-aminophenyl)-3-phenylbenzofuran, analogously to Example 3, is added dropwise at 0° within 1 hour to a solution of 14.8 g. of benzylmethyl ketone in 200 ml. of pyridine. The reaction mixture is subsequently stirred for 18 hours at room temperature. The obtained azo compound is filtered off under suction, washed with water, and suspended in 600 ml. of boiling ethanol. To the boiling suspension are added 7.7 g. of hydroxylamine hydrochloride dissolved in 10 ml. of water, and 7.4 g. of sodium acetate trihydrate dissolved in 10 ml. of water. The reaction mixture is afterwards stirred at boiling temperature for a further 16 hours; it is then filtered off with suction and washed with water. After drying, 27.2 g. (corresponding to 61% of the theoretical value) of oxime hydrazone are obtained.

44.3 g. of the thus obtained oxime hydrazone are dissolved in 400 ml. of pyridine at 90–95°. To the obtained solution is then added dropwise a solution of 75 g. of copper sulphate pentahydrate dissolved in 60 ml. of water, and the solution is stirred for a further 4 hours. The reaction mixture is afterwards diluted with 400 ml. of water, cooled, the formed v-triazole-1-oxide filtered off under suction, dried and then refluxed with 15 g. of zinc dust and 30 ml. of glacial acetic acid in 500 ml. of chlorobenzene for 8 hours. The reaction mixture is thereupon filtered hot, and the chlorobenzene is expelled by means of steam. The 1-(3-phenylbenzofur-2-yl)-4-(4'-methyl-5'-phenyl-v-triabole-2-yl)-phenylene which remains is recrystallised four times (with the aid of bleaching earth) from ligroin and it melts at 184–185° (uncorrected), absorption λmax. 345 nm.

In an analogous manner are obtained the benzofurans given in the following table, which have similar properties:

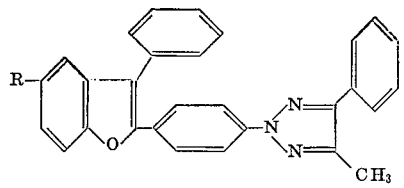

| | | Melting point uncorrected, degrees | Absorption λmax. |
|---|---|---|---|
| 8.2 | CH₃O | 174–176 | 355 |
| 8.3 | Cl | 199–201 | 345 |

Example 9

A solution is produced of the optical brightener 5.1 described in Example 5: 1-(3-methylbenzofur-2-yl)-4-(naphtho-1,2:4',5'-triazol-2'-yl)-phenylene, by dissolving 1 g. thereof in 1000 ml. of dimethylformamide. 3 ml. of this stock solution are added to 100 ml. of water containing 0.2 g. of trichlorobenzene as carrier. By the expression: "trichlorobenzene as carrier" is meant, in this and in the following examples 41 and 42, a mixture consisting of 76 parts by weight of 1,2,4-trichlorobenzene and 27 parts by weight of a combination of suitable emulsifiers.

This aqueous solution containing the brightener is heated to 60°; then 3 g. of polyester fabric are introduced into the solution. The temperature is raised in the course of 10–15 minutes to 95–98°, and this temperature is maintained for 1 hour. The fabric is rinsed and dried. The thus treated fabric possesses a white, brilliant appearance.

If, instead of the above stated brightener, an equal amount of 1-(5,7-dichlorobenzofur-2-yl)-4-(naphtho-1,2:4',5'-triazol-2'-yl)-phenylene described in Example 1.3, or 1 - (3 - methyl - 5,7 - dichlorobenzofur - 2 - yl) - 4 - (naphtho-1,2:4',5'-triazol-2'-yl)-phenylene described in Example 5.7, or 1-(3-phenyl-5-carbomethoxybenzofur-2-yl)-4-(naphtho-)-1,2:4',5'-triazol-2'-yl) - phenylene described in Example 7.4, is used, with otherwise the same procedure, then similar brightening effects are obtained.

Example 10

To 100 ml. of water are added 0.2 g. of sodium chlorite, 0.2 g. of sodium nitrite and 0.2 g. of oxalic acid. A solution is prepared of the optical brightener 5.1 described in Example 5: 1-(3-methylbenzofur-2-yl)-4-(naphtho-1,2:4', 5'-triazol-2'-yl)-phenylene, by dissolving 1 g. thereof in 1000 ml. of dimethylformamide. 3 ml. of this stock solution are added to the above described aqueous solution. To this aqueous solution are additionally added 0.2 g. of trichlorobenzene as carrier. This solution is heated to 60° and into it are then introduced 3 g. of polyester fabric. The temperature is raised within 10–15 minutes to 85° and this temperature is maintained for 30 minutes. The temperature is then raised to 98–100°, and the treatment proceeds for a further 30 minutes at this temperature. The fabric is rinsed and dried. The thus treated fabric has a white, brilliant appearance. Similar effects are obtained if, instead of the above stated brightener, the same amount of 1-(5,7-dichlorobenzofur-2-yl)-4-(naphtho-1,2:4',5'-triazol-2'-yl)-phenylene described in Example 1.3, or 1-(3-methyl-5,7-dichlorobenzofur-2-yl)-4-(naphtho - 1,2:4',5'-triazol-2'-yl)-phenylene described in Example 5.7, or 1-(3 - phenyl - 5 - carbomethoxybenzofur - 2 - yl) - 4 - (naphtho - 1,2:4',5' - triazol - 2' - yl) - phenylene described in Example 7.4, is used, with otherwise the same procedure.

Example 11

To 285 ml. of water are added 0.3 g. of alkylpolyglycol ether and 0.15 g. of trichlorobenzene as carrier.

A solution is produced of the optical brightener 7.1 described in Example 7: 1-(3-phenylbenzofur-2-yl)-4-(naphtho-1,2:4',5'-triazol-2'-yl)-phenylene, by dissolving 1 g. thereof in 1000 ml. of dimethylformamide. 15 ml. of this stock solution are then added to the above described solution. This solution containing the brightener is heated to 20–30°, and into it are then introduced 15 g. of a polyester fabric. The temperature is raised within 30 minutes to 130° and this temperature is maintained for 30 minutes. The whole is cooled within 15–20 minutes to 60°; the fabric is rinsed and dried and afterwards thermofixed for 30 seconds at 200° with hot air.

The thus treated fabric has a white, brilliant appearance.

If, instead of the above stated brightener, the identical amount of 1-(5,7-dichlorobenzofur-2-yl)-4-(naphtho-1,2: 4',5'-triazol-2'-yl)-phenylene described in Example 1.3, or 1-(3,4,6-trimethyl-5-chlorobenzofur-2-yl) - 4 - (naphtho-1,2:4',5'-triazol-2'-yl)-phenylene described in Example 5.13, is used, with otherwise the same procedure, then similar effects are obtained.

EXAMPLE 12

To 100 ml. of water are added 0.12 ml. of 85% formic acid and 0.06 g. of an alkylpolyglycol ether.

A solution is produced of the optical brightener 2.1 described in Example 2: 1-(5 - chlorobenzofur-2-yl)-4-(naphtho - 1,2:4',5' - triazol - 2' - yl) - phenylene-6'-sulphonic acid, by dissolving 1 g. thereof in 1000 ml. of dimethylformamide. 1.5 ml. of this stock solution are added to the above described aqueous solution.

This aqueous solution containing the brightener is heated to 60°, and into this solution are then introduced 3 g. of nylon staple fabric. The temperature is raised within 10–15 minutes to 90–92° and this temperature is maintained for 30 minutes. The fabric is rinsed and dried. The thus treated fabric possesses a white and brilliant appearance.

Similar effects are obtained by using, instead of the above stated brightener, identical amounts of 1-(5,7-dichlorobenzofur - 2 - yl) - 4 - (naphtho - 1,2:4',5' - triazol - 2' - yl) - phenylene described in Example 1.3, or 1 - (3 - methylbenzofur - 2 - yl) - 4 - naphtho-1,2:4',5'-triazol - 2' - yl) - phenylene described in Example 5.1, or 1 - (3 - phenylbenzofur - 2 - yl) - 4 - (naphtho-1,2:4',5'-triazol - 2' - yl) - phenylene described in Example 7.1, or 1 - (3 - phenyl - 5 - methoxybenzofur - 2 - yl) - 4 - (4'-methyl - 5' - phenyl-v-triazol - 2' - yl) - phenylene described in Example 8.2, with otherwise the same procedure.

Excellent effects are also obtained by using the brighteners described in Examples 1.4, 1.5 and 1.6.

EXAMPLE 13

To 100 ml. of water are added 0.4 g. of detergent as given in Example 19.

A solution is prepared of the optical brightener 2.1 described in Example 2: 1 - (5 - chlorobenzofur - 2 - yl) - 4 - (naphtho - 1,2:4',5' - triazol - 2' - yl) - phenylene-6'-sulphonic acid, by dissolving 1 g. thereof in 1000 ml. of dimethylformamide. 1.5 ml. of this stock solution are added to the above described aqueous solution. The aqueous solution containing the brightener is heated to 55–60°, and into the solution are then introduced 3 g. of polyamide fabric. This temperature is maintained for 20 minutes, whereupon the fabric is rinsed and dried.

The thus treated fabric has a brilliant, white appearance.

Similar effects are obtained by using, with otherwise the same procedure, instead of the above stated brightener, identical amounts of 1-(5,7-dichlorobenofur-2-yl)-4-(naphtho-1,2:4',5'-triazol-2'-yl)-phenylene described in Example 1.3, or
1-(3-methylbenzofur-2-yl)-4-(naphtho-1,2:4',5'-triazol-2'-yl)-phenylene described in Example 5.1, or
1-(3-phenylbenzofur-2-yl)-4-(naphtho-1,2:4',5'-triazol-2'-yl)-phenylene described in Example 7.1.

EXAMPLE 14

To 100 ml. of water are added 0.06 g. of an alkylpolyglycol ether.

A solution is produced of the optical brightener 2.1 described in Example 2: 1 - (5 - chlorobenzofur-2-yl)-4-(naphtho - 1,2:4',5' - triazol - 2' - yl)-phenylene-6'-sulphonic acid in the form of the sodium salt, by dissolving 1 g. thereof in 1000 ml. of dimethylformamide. 1.5 ml. of this stock solution are added to the above described aqueous solution.

This aqueous solution containing the brightener is heated to 60° and 3 g. of nylon staple fabric are introduced. The temperature is raised within 10–15 minutes to 90–92° and this temperature is maintained for 30 minutes. The fabric is rinsed and dried. The thus treated fabric possesses a white and brilliant appearance. Similar results are obtained by using, with otherwise the same procedure as stated in the above example, instead of the brightener mentioned there, identical amounts of the compound given in Example 5.1:

1-(3-methylbenzofur-2-yl)-4-(naphtho-1,2:4',5'-triazol-2'-yl)-phenylene, or
1-(3-methyl-6-methoxybenzofur-2-yl)-4-(4'-methyl-5'-phenyl-v-triazol-2'-yl)-phenylene, described in Example 6.3.

EXAMPLE 15

To 100 ml. of water are added 0.6 ml. of 4% acetic acid and 0.06 g. of an alkylpolyglycol ether.

A solution is produced of the optical brightener 7.1 described in Example 7: 1-(3 - phenylbenzofur-2-yl)-4-(naphtho - 1,2:4',5' - triazol - 2' - yl) - phenylene, by dissolving 1 g. thereof in 100 ml. of dimethylformamide. 1.5 ml. of this stock solution are added to the above described aqueous solution. This aqueous solution containing the brightener is heated to 40°, and 3 g. of polypropylene fabric ("Meraklon") are introduced into the solution. The temperature is raised within 10–15 minutes to 95–98° and this temperature is maintained for 30 minutes. The fabric is rinsed and dried.

The thus treated fabric possesses a white, brilliant appearance.

If, instead of the above stated brightener, identical amounts are used of 1-(3,5 - dimethylbenzofur - 2 - yl)-4-(naphtho - 1,2:4',5' - triazol - 2' - yl) - phenylene as described in Example 5.2, or 1-(3-phenyl - 5 - chlorobenzofur - 2 - yl) - 4 - (naphtho - 1,2:4',5' - triazol-2'-yl)-phenylene as described in Example 7.2, with otherwise the same procedure, then similar effects are obtained.

Example 16

To 100 ml. of water are added 0.2 g. of di-n-octyl sodium sulphosuccinate.

A 10% sand milling is produced of the optical brightener 5.13 described in Example 5: 1-(3,4,6-trimethyl-5-chlorobenzofur-2-yl)-4-naphtho - 1,2:4',5' - triazol-2'-yl)-phenylene. 3 g. of this sand milling are added to the above described aqueous solution. This solution is used to pad at 20° a polyester fabric (roller pressure 30 kg./cm.$^2$, speed 3 m./min., squeezing effect 50–60%). The fabric is dried at ca. 60°. The dry fabric is fixed for 30 seconds at 200°. The thus treated fabric has a white, brilliant appearance. Similar effects are obtained by using, with otherwise the same procedure, instead of the above stated brightener, identical amounts of 1-(3-phenylbenzofur-2-yl)-4-naphtho - 1,2:4',5' - triazol-2'-yl)-phenylene as described in Example 7.1.

Example 17

To 100 ml. of water are added 0.6 ml. of 4% acetic acid and 0.06 g. of an alkylpolyglycol ether.

A solution is prepared of the optical brightener 7.1 described in Example 7: 1-(phenylbenzofur-2-yl)-4-naphtho-1,2:4',5'-triazol-2'-yl)-phenylene, by dissolving 1 g. thereof in 1000 ml. of dimethylformamide. 6 ml. of this stock solution are added to the above described aqueous solution. This aqueous solution containing the brightener is heated to 60°, and 3 g. of triacetate twill fabric are then introduced into the solution. The temperature is raised within 10–15 minutes to 95–98° and this temperature is maintained for 30 minutes. The fabric is rinsed and dried.

The thus treated fabric possesses a white, brilliant appearance.

If, instead of the above stated brightener, identical amounts of 1-(3,5-dimethylbenzofur-2-yl)-4-naphtho-1,2:4',5'-triazol-2'-yl)-phenylene as described in Example 5.2, are used, with otherwise the same procedure, then similar effects are obtained.

Example 18

To 100 ml. of water are added 0.6 ml. of 4% acetic acid and 0.06 g. of an alkylpolyglycol ether.

A solution is prepared of the optical brightener 7.1 described in Example 7: 1-(3-phenylbenzofur-2-yl)-4-(naphtho-1,2:4',5'-triazol-2'-yl)-phenylene, by dissolving 1 g. thereof in 1000 ml. of dimethylformamide. 6 ml. of this stock solution are added to the above described aqueous solution. This aqueous solution containing the brightener is heated to 40°, and 3 g. of acetate satin fabric are introduced into the solution. The temperature is raised within 10–15 minutes to 78° and this temperature is maintained for 30 minutes. The fabric is rinsed and dried.

The thus treated fabric possesses a white, brilliant appearance.

Similar results are obtained by using, instead of the brightener mentioned in the above example, identical amounts of the compound 1-(3,5-dimethylbenzofur-2-yl)-4-naphtho-1,2:4',5-triazol-2'-yl)-phenylene as described in Example 5.2, with otherwise the same procedure as stated in the above example.

Example 19

To 100 ml. of water are added 0.4 g. of detergent of the following composition:

|  | Percent |
|---|---|
| Dodecylbenzene sulphonate | 16 |
| Fatty alcohol sulphonate | 4 |
| Tetrasodium pyrophosphate | 7 |
| Na-tripolyphosphate | 35 |
| Mg-silicate (MgSiO$_3$) | 2 |
| Na-disilicate (Na$_2$(SiO$_3$)$_2$) | 7 |
| Carboxymethyl cellulose | 1 |
| Ethyldiaminotetraacetic acid Na-salt | 0.5 |
| Sodium sulphate | ca. 25 |
| Water | 2.5 |

(Instead of sodium sulphate, the detergent can also contain 10–20% of Na-perborate or another oxygen-releasing agent.)

A solution is produced of the optical brightener 5.1 described in Example 5: 1-(3-methylbenzofur-2-yl)-4-(naphtho-1,2:4',5'-triazol-2'-yl)-phenylene, by dissolving 1 g. thereof in 1000 ml. of dimethylformamide. 2 ml. of this stock solution are added to the above described aqueous solution. This aqueous solution containing the brightener is heated to 92°, and 3 g. of cotton fabric are introduced into the solution; this temperature is then maintained for 30 minutes. The fabric is rinsed and dried. The thus treated fabric has a white, brilliant appearance.

Similar effects are obtained if, instead of the above stated brightener, identical amounts are used of 1-(3-methyl-5-chlorobenzofur - 2 - yl)-4-(naphtho-1,2:4',5'-triazol-2'-yl)-phenylene as described in Example 5.4, or 1-(3-methyl - 6 - methoxybenzofur-2-yl)-4-(4'-methyl-5'-phenyl-v-triazol-2'-yl) as described in Example 6.3, with otherwise the same procedure.

Example 20

To 100 ml. of water are added 0.2 g. of sodium sulphate and 0.06 g. of a higher alkylpolyglycol ether.

A solution is prepared of the optical brightener 2.1 described in Example 2: 1-(5'-chlorobenzofur-2-yl)-4-(naphtho-1,2:4',5'-triazol-2'-yl) - phenylene - 6' - sulphonic acid—in the form of the sodium salt, by dissolving 1 g. in 1000 ml. of dimethylformamide. 2 ml. of this stock solution are added to the above described solution. This aqueous solution containing the brightener is heated to 40–45°, and 3 g. of a cotton fabric are then introduced into the solution. This temperature is maintained for 30 minutes, whereupon the fabric is rinsed and dried. The thus treated fabric has a white, brilliant appearance.

Similar results are obtained by using, with otherwise the same procedure as described in the above example, instead of the brightener stated there, identical amounts of the compound given in Example 2.3: 1-(5,7-dichlorobenzofur-2-yl)-4-(naphtho - 1,2:4',5' - triazol - 2' - yl)-phenylene-6'-sulphonic acid.

Example 21

To 115 ml. of water are added 0.06 of an alkylpolyglycol ether.

A solution is produced of the brightener 2.3 described in Example 2: 1 - (5,7 - dichlorobenzofur - 2 - yl) - 4 - (naphtho - 1,2:4',5' - triazol - 2' - yl) - phenylene - 6'-sulphonic acid—in the form of the sodium salt, by dissolving 1 g. thereof in 1000 ml. of dimethylformamide. 6 ml. of this stock solution are added to the above described solution. This aqueous solution containing the brightener is heated to 60°, and 0.36 g. of a stabilised hydrosulphite are added. 3 g. of wool fabric are then introduced into the solution and this temperature is maintained for 60 minutes. The fabric is rinsed and dried. The thus treated material has a white, brilliant appearance.

Similar effects are obtained by using, with otherwise the same procedure, instead of the above stated brightener, identical amounts of 1 - (3 - methylbenzofur - 2-yl) - 4 - (naphtho - 1,2:4',5' - triazol - 2' - yl)-phenylene-6'-sulphonic acid, as described in Example 5.5.

Example 22

100 parts of propylene with 0.5 part of titanium dioxide and 0.05 parts of optical brightener 5.13 described in Example 5: 1 - (3,4,6 - trimethyl - 5 - chlorobenzofur-2 - yl) - 4 - (naphtho - 1,2:4',5' - triazol - 2' - yl)-phenylene, are homogenised in a kneading machine at 200°. The melt is spun through spinning nozzles, by known methods, under inert gas at 2–3 atm. and at a temperature of 280–300°. The thus obtained polypropylene threads are distinguished by a high degree of whiteness. Similar effects are obtained by using, instead of the above stated brightener, identical amounts of 1-(3-phenylbenzofur - 2 - yl) - 4 - (naphtho - 1,2:4',5' - triazol - 2' yl)-phenylene as described in Example 7.1, with otherwise the same procedure.

Example 23

67 parts of polyvinyl chloride powder, 33 parts of dioctyl phthalate, 2 parts of di-n-butyl-dilauryldioxystannate, 0.3 part of sodium-pentaoctyltripolyphosphate with 0.05 part of the optical brightener (described in Example 5) of formula 5.13 1-(3,4,6-trimethyl-5-chlorobenzofur - 2 - yl) - 4 - (naphtho - 1,2:4',5' - triazol - 2'-yl)-phenylene, are gelatinised on the mixing rollers at 160° for 15 minutes, and subsequently drawn out to sheets. The polyvinyl chloride sheet produced in this manner exhibits in daylight a strong fluorescene and a brilliant white appearance.

If, instead of the above stated brightener, identical amounts are used of 1-(benzofur-2-yl)-4-(naphtho-1,2:4',5'-triazol-2'-yl)-phenylene described in Example 1.1, or 1 - (3 - phenylbenzofur - 2 - yl) - 4 - (naphtho - 1,2:4',5'-triazol-2'-yl)-phenylene described in Example 7.1, with otherwise the same procedure, then similar effects are obtained.

The brighteners 1.4, 1.5 and 1.6 give to the sheet a brilliant white appearance, too.

Example 24

1000 parts of polyester granulate made from polyterephthalic acid ethylene glycol are intimately mixed with 0.25 part of the optical brightener 1.1 described in Example 1:

1 - (benzofur - 2 - yl) - 4 - (naphtho - 1,2:4' - triazol-2'-yl)-phenylene, and the mixture is then spun under nitrogen from an extruder, at a temperature of 265–285°, in a known manner through a spinning nozzle to form threads. The thus obtained polyester threads have a brilliant white appearance.

Similar results are obtained by using, wth the procedure as described in the above example, instead of the brightener stated there, identical amounts of the compound given in Example 5.1:

1-(3-(3-methylbenzofur-2-yl)-4-(naphtho-1,2:4′,5′-triazol-2′-yl)-phenylene, or 1-(3-phenylbenzofur-2-yl)-4-(naphtho-1,2:4′,5′-triazol-2′-yl)-phenylene described in Example 7.1, or 1-(3-phenyl-5-carbomethoxybenzofur-2-yl)-4-(naphtho-1,2:4′,5′-triazol-2′-yl)-phenylene described in Example 7.4.

Example 25

In a high-grade alloy steel autoclave provide with a stirrer, a gas-inlet tube, a vacuum arrangement, a descending condenser and a heating jacket, 388 g. of benzene-1,4-dicarboxylic acid dimethyl ester, 300 g. of 1,2-ethanediol and 0.4 g. of antimonous oxide are heated, whilst pure nitrogen is blown through, to 200° external temperature, and held at this temperature for 3 hours, whereby methanol slowly distills off. With the exclusion of air, 0.4 g. of optical brightener 7.4 described in Example 7:

1 - (3 - phenyl - 5 - carbomethoxybenzofur - 2 - yl) - 4 - (naphtho - 1,2:4′,5′ - triazol - 2′ - yl) - phenylene, dissolved in 40 g. of 1,2-ethanediol, are carefully fed into the autoclave, after the temperature has been allowed to fall to 190°. After the addition is completed, the temperature is raised within one hour to 285° external temperature, whereby 1,2-ethanediol distills off. The autoclave is then put under vacuum, the pressure slowly reduced to 0.2 torr, and condensation completed during 3 hours under these conditions. Vigorous stirring is maintained during these operations. The liquid condensation polymer is then extruded with nitrogen through the nozzle in the base. From the thus obtained polymers it is possible to produce monofilaments having a brilliant white appearance.

Similar effects are obtained by using, with otherwise the same procedure, instead of the above stated brightener, identical amounts of 1-(benzofur-2-yl)-4-(naphtho-1,2:4′,5′-triazol-2′-yl)-phenylene as described in Example 1.1, or 1 - (3 - methylbenzofur - 2 - yl) - 4 - (naphtho-1,2:4′,5′-triazol-2′-yl)-phenylene as described in Example 5.1, or 1 - (3 - phenylbenzofur - 2 - yl) - 4 - (naphtho-1,2:4′,5′-triazol-2′-yl)-phenylene as described in Example 7.1.

Example 26

300 parts of hexamethylenediamine adipate are dissolved in 300 parts of distilled water at 80°. Into this solution are introduced 1.8 parts of sebacic acid, 1.2 parts of titanium dioxide (Anatas), and 0.3 part of the optical brightener 7.5 described in Example 7: 1-(3-phenyl-5-diethylaminosulphobenzofur-2-yl) - 4 - (naphtho-1,2:4′,5′-triazol-2′-yl)-phenylene, and stirring proceeds until a homogeneous distribution obtains. With the exclusion of oxypen, the liquid mixture is fed into the autoclave preheated to ca. 150°, and the temperature is thereupon raised within one hour to 280°. During this time the pressure in the autoclave is maintained below 30 atmospheres by the releasing of steam. After attainment of the temperature maximum of 280–290°, the pressure is reduced, by the release of the volatile constituents, within 10 to 20 minutes to atmospheric pressure. With the exclusion of oxygen, the mass is subsequently maintained at atmospheric pressure for a further 4 hours at 280°. After this period of time, condensation has progressed to the extent that the polycondensate can be spun by means of nitrogen through a nozzle in the base of the autoclave. In this manner is obtained pure white polyamide threads.

Similar effects are obtained by using with otherwise the same procedure, instead of the above mentioned brightener, identical amounts of:

1-(3-phenylbenzofur-2-yl) - 4 - (4′-methyl-5′-phenyl-v-triazole-2′-yl)-phenylene, described in Example 8.1, or 1 - (3,5-dimethylbenzofur-2-yl)-4-(4′-methyl-5′-phenyl-v-triazole-2′-yl)-phenylene, described in Example 6.6, or 1 - (3-phenyl-5-carbomethoxybenzofur-2-yl)-4-(naphtho-1,2:4′,5′-triazol-2′-yl)-phenylene, described in Example 7.4.

Example 27

400 parts of caprolactam, 40 parts of water, 0.4 part of the optical brightener 7.5 described in Example 7: 1-(3 - phenyl-5-diethylaminosulphobenzofur-2-yl)-4-(naphtho-1,2:4′,5′-triazol-2′-yl)-phenylene, and 1.6 parts of titanium dioxide (Anatas) are mixed together and heated, until liquefaction of the mass, to ca. 70°. The liquid mixture is fed into a stainless-steel pressure-vessel and heated, with the exclusion of oxygen, within one hour to a temperature of ca. 250°, whereby a pressure of 10–15 atmospheres is produced. After this period of time, the water is distilled off and the polymeric mass is subsequently held, for complete degassing, for 3 hours without pressure at 250°. The mass thereby attains a viscosity which enables the polymerisate to be extruded in the form of tapes or filaments through a nozzle fixed in the base of the pressure-vessel. The solidified polyamide is separated by extraction with water from monomeric parts. The polyamide fibre obtained by this process is distinguished by a very high degree of whiteness.

Similar results are obtained by proceeding as described in the above example but using, instead of the brightener mentioned there, identical amounts of the compound stated in Example 6.1:

1-(3,4,6-trimethyl-5-chlorobenzofur-2-yl)-4-(4′-methyl-5′-phenyl-v-triazol-2′-yl)-phenylene, or 1-(3-phenyl-5-carbomethoxybenzofur-2-yl)-4-(naphtho-1,2:4′,5′-triazol-2′-yl)-phenylene, described in Example 7.4, or 1-(3-phenylbenzofur-2-yl)-4-(4′-methyl-5′-phenyl-v-triazol-2′-yl)-phenylene, described in Example 8.1.

Example 28

1000 parts of granulated nylon 6 and 1 part of the finely pulverised optical brightener 7.5 described in Example 7: 1-(3-phenyl - 5 - diethylaminosulphobenzofur-2-yl)-4-(naphtho - 1,2:4′,5′ - triazol-2′-yl) - phenylene are mixed together for 3 hours in a tumbling vessel. The granulate is subsequently extruded by means of a screw press, with the temperature of the mass at 250°, in the form of an endless spiral of 2 mm. diameter, and afterwards granulated. The material obtained in this manner, compared to the starting granulate, has an improved colour, i.e. a high degree of whiteness. It can be further processed on the usual machines into the desired shapes, or spun into filaments which exhibit a brilliant degree of whiteness. Similar effects are obtained with the same procedure but using, instead of the above mentioned brightener, identical amounts of 1-(3,4,6-trimethyl-5-chlorobenzofur-2-yl)-4-(4′-methyl-5′-phenyl-v-triazol-2′-yl)-phenylene, described in Example 6.1, or 1 - (3-phenylbenzofur-2-yl)-4-(4′-methyl-5′-phenyl-v-triazol-2′-yl)-phenylene, described in Example 8.1, or 1-(3-phenyl-5-carbomethoxybenzofur-2-yl) - 4 - (naphtho-1,2:4′,5′-triazol-2′-yl)-phenylene, described in Example 7.4.

Example 29

In a drum are mixed 1000 parts of polyamide shreds, obtained in a known manner from hexamethyleneadipate, with 5 parts of titanium dioxide and 0.5 part of the optical brightener 7.5 described in Example 7: 1-(3-phenyl-5-diethylaminosulphobenzofur-2-yl)-4-(naphtho-1,2:4′, 5′-triazol-2′-yl)-phenylene, during 10–16 hours. The thus treated shreds are then melted in an apparatus with the exclusion of oxygen, and stirred for a short time. The melt is subsequently spun under a nitrogen atmosphere of 5 atm. through spinning nozzles, and stretched. The polyamide threads produced in this manner exhibit a high degree of whiteness.

Similar effects are obtained with the same procedure but using, instead of the above mentioned brightener, identical amounts of 1 - (3,5-dimethylbenzofur-2-yl)-4-(4'-methyl-5'-phenyl-v-triazol-2'-yl)-phenylene, described in Example 6.6, or 1-(3,4,6-trimethyl-5-chlorobenzofur-2-yl)-4-(4'-methyl-5'-phenyl-v-triazol-2'-yl)-phenylene, described in Example 6.1, or 1 - (3-phenylbenzofur-2-yl)-4-(4'-methyl-5'-phenyl-v-triazol-2'-yl)-phenylene, described in Example 8.1.

What we claim is:

1. Benzofurans of Formula I

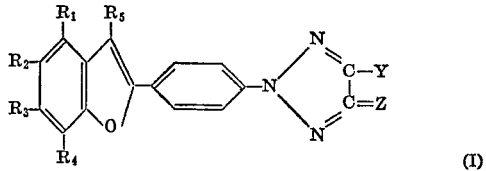

(I)

wherein $R_1$ represents hydrogen or alkyl having 1 to 4 carbon atoms, $R_2$ represents hydrogen, an alkyl groups having 1–6 carbon atoms, an alkoxy group having 1–4 carbon atoms, chlorine, the carboxy group, a carbalkoxy group having 2–5 carbon atoms, a dialkylaminosulphonyl group having 1–4 carbon atoms in each alkyl group, or phenyl, $R_3$ represents hydrogen, an alkyl grou phaving 1–4 carbon atoms, or an alkoxy group having 1–4 carbon atoms, $R_4$ represents hydrogen or chlorine, $R_5$ represents hydrogen, an alkyl group having 1–4 carbon atoms, or the phenyl group, Y represents the phenyl group, Z represents the methyl group, or Y and Z together with the carbon atoms of the triazole ring represent a phenylene group which can be substituted in the 4- and/or 5-position by an alkyl group having 1–4 carbon atoms, or by an alkoxy group having 1–4 carbon atoms; or a naphthylene-(1,2)-group which can be substituted by the sodium salt of sulphonic acid group or dialkylaminosulphonyl group having 1–4 carbon atoms in each alkyl group.

2. A compound according to claim 1 wherein $R_1$ is hydrogen or methyl, $R_2$ is hydrogen, chlorine, alkyl having 1 to 4 carbon atoms, methoxy, carbomethoxy, diethylaminosulphonyl or phenyl, $R_3$ is hydrogen, methyl, chlorine or methoxy, $R_4$ is hydrogen or methyl, $R_5$ is hydrogen, methyl or phenyl, Y is phenyl, Z is methyl, and Y and Z together with the carbon atoms of the triazole ring represent a phenylene group which can be substituted in the 4 and/or 5-position by methyl or methoxy; or a naphthylene-(1,2)-group which can be substituted by a sodium salt of sulphonic acid group or by diethylaminosulphonyl.

3. A compound according to claim 1 which is

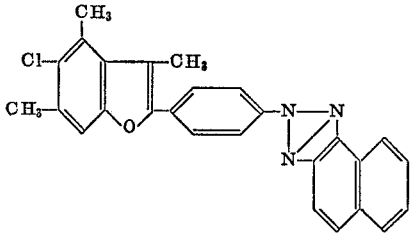

4. A compound according to claim 1 which is

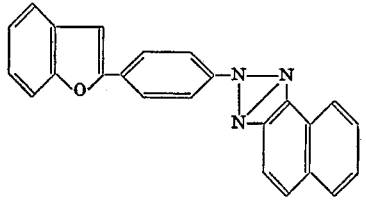

5. A compound according to claim 1 which is

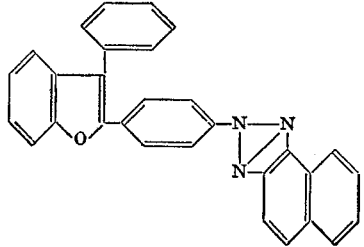

References Cited

UNITED STATES PATENTS 3,288,804   11/1966   Fleck et al. _____ 260—308

ALTON D. ROLLINS, Primary Examiner

U.S. Cl. X.R.

8—1 W; 117—33.5 T; 252—301.2 W; 260—141, 308 A, 346.2 R